TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Filed Sept. 11, 1959

INVENTORS
ROBERT A. LEE
CAMILLE S. MARIE'
BY K. G. Doub
ATTORNEY

TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Filed Sept. 11, 1959 6 Sheets-Sheet 2

INVENTORS
ROBERT A. LEE
CAMILLE S. MARIE'
BY K. G. Doub
ATTORNEY

May 21, 1963 R. A. LEE ET AL 3,090,829

TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Filed Sept. 11, 1959 6 Sheets-Sheet 3

INVENTORS
ROBERT A. LEE
CAMILLE S. MARIE'

BY K. G. Doub
ATTORNEY

TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Filed Sept. 11, 1959

INVENTORS
ROBERT A. LEE
CAMILLE S. MARIE'
BY K. G. Doub
ATTORNEY

TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Filed Sept. 11, 1959 6 Sheets-Sheet 5

INVENTORS
ROBERT A. LEE
CAMILLE S. MARIE'
BY K. G. Doub
ATTORNEY

FIG. 6 PULSE TIMING DIAGRAM
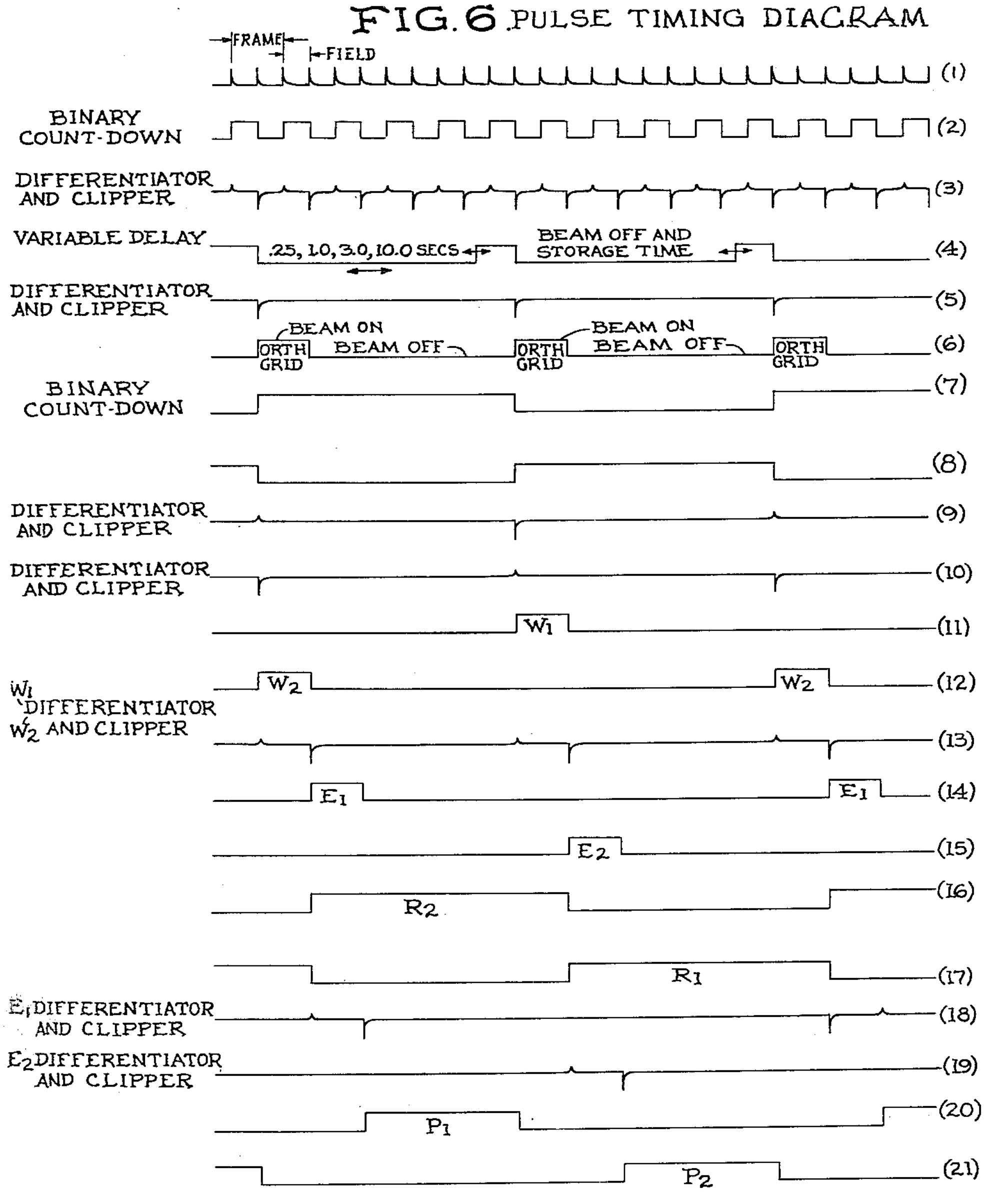
W = WRITE - ($W_1$ STORAGE TUBE 25; $W_2$ STORAGE TUBE 26)
P = PRIME STORAGE TUBE SCREEN - ($P_1$ TUBE 25; $P_2$ TUBE 26)
E = ERASE STORAGE TUBE SCREEN - ($E_1$ TUBE 25; $E_2$ TUBE 26)
R = READ (SIGNAL CONDUCTED FROM COLLECTOR PLATE - $R_1$ TUBE 25, $R_2$ TUBE 26)
INVENTORS
ROBERT A. LEE
CAMILLE S. MARIE'
BY K. G. Doub
ATTORNEY United States Patent Office 3,090,829
Patented May 21, 1963

3,090,829

TELEVISION SYSTEM UTILIZING BEAM PULSING TO IMPROVE SENSITIVITY AT LOW LIGHT LEVELS AND COORDINATED MEANS TO ELIMINATE FLICKER AT THE KINESCOPE DISPLAY

Robert A. Lee, Timonium, and Camille S. Marie, Pikesville, Md., assignors to The Bendix Corporation, a corporation of Delaware Filed Sept. 11, 1959, Ser. No. 839,428
8 Claims. (Cl. 178—6.8)

This invention is concerned with television systems which improve sensitivity at low light levels by alternately biasing or "pulsing" the electron scanning beam at the pickup or camera tube "off" and "on" while continuously televising a scene, to permit signal integration or charge build-up on the target during "off" time until the charge attains a substantial beam-modulating potential and reading it off quickly during "on" time. This results in more complete signal integration at the target with subsequent improved signal-to-noise ratio upon discharge of the target by the scanning beam. It has been proposed to also pulse the kinescope or picture tube scanning beam off and on in synchronism with the pickup beam, to delay erasure of the picture over the early part of the decay period, thus giving an observer time to comprehend the kinescope display. While the pulsing method markedly improves sensitivity at low light levels, the intermittent display of video signals results in picture flicker at the kinescope; and the primary object of this invention is to provide a system which effectively overcomes this objection by presenting a continuous display of discontinuous bursts of video signals.

In carrying out the method of the present invention, we preferably employ a pickup tube of the return beam type (Image Orthicon) utilizing a target having a relatively high resistance to lateral conductivity. The scanning beam is alternately biased "off" and "on" while the scene is being continuously imaged or televised, the "on" period being, say, 40 milliseconds and the "off" period, say, 4 seconds. During the "off" period the information signals build up or integrate on the target of the pickup tube to a point where the charge attains a beam modulating potential much greater than would be the case were the target scanned continuously. During the "on" period the target is scanned or "read'" and the resultant output signals amplified in the usual manner; but instead of transmitting the bursts of output signals directly to a kinescope receiver, successive frames or fields are alternately written on the screens of a pair of storage tubes and alternately conducted from the collector plates or electrodes of said tubes and recombined into a single train or channel before being transmitted to the kinescope receiver. During the time the storage screen of one tube is being erased and primed, video information for the kinescope display is being taken from the collector plate of the other tube, and vice versa, by a gated amplifier and video switch which delivers the signals in sequential order to a single output channel leading to the receiver or kinescope display.

Another and more specific object is to provide, in conjunction with a pulsed beam system utilizing intermediate storage tubes and coacting electronic switches for channeling individual bursts of video into a continuous chain, an effective means for correlating and controlling the switch-gating pulses and tube-operating potentials.

Other objects and advantages will become apparent in the light of the following description taken in conjunction with the drawings, wherein.

Figure 5:
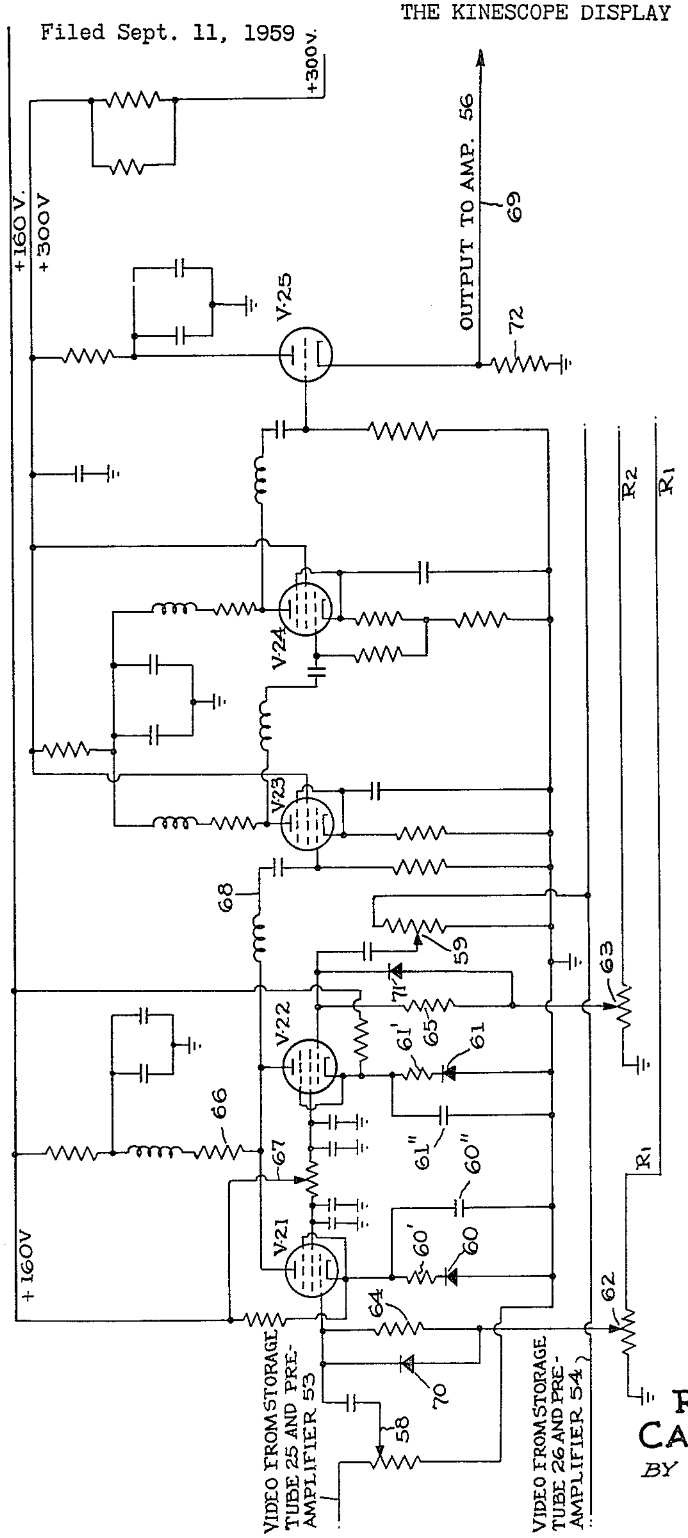

FIG. 5 is an electrical diagram of a gated video output amplifier or electronic switch for the storage tubes; it incorporates an electronic switch which functions as a mixer to arrange the alternate bursts of video signals from the tubes into a single continuous train for delivery to the kinescope input amplifier; and FIG. 6 shows a series of basic pulse trains for coordinating the operation of the intermediate signal storage and delay system with that of the pickup or camera tube.

Figure 1:
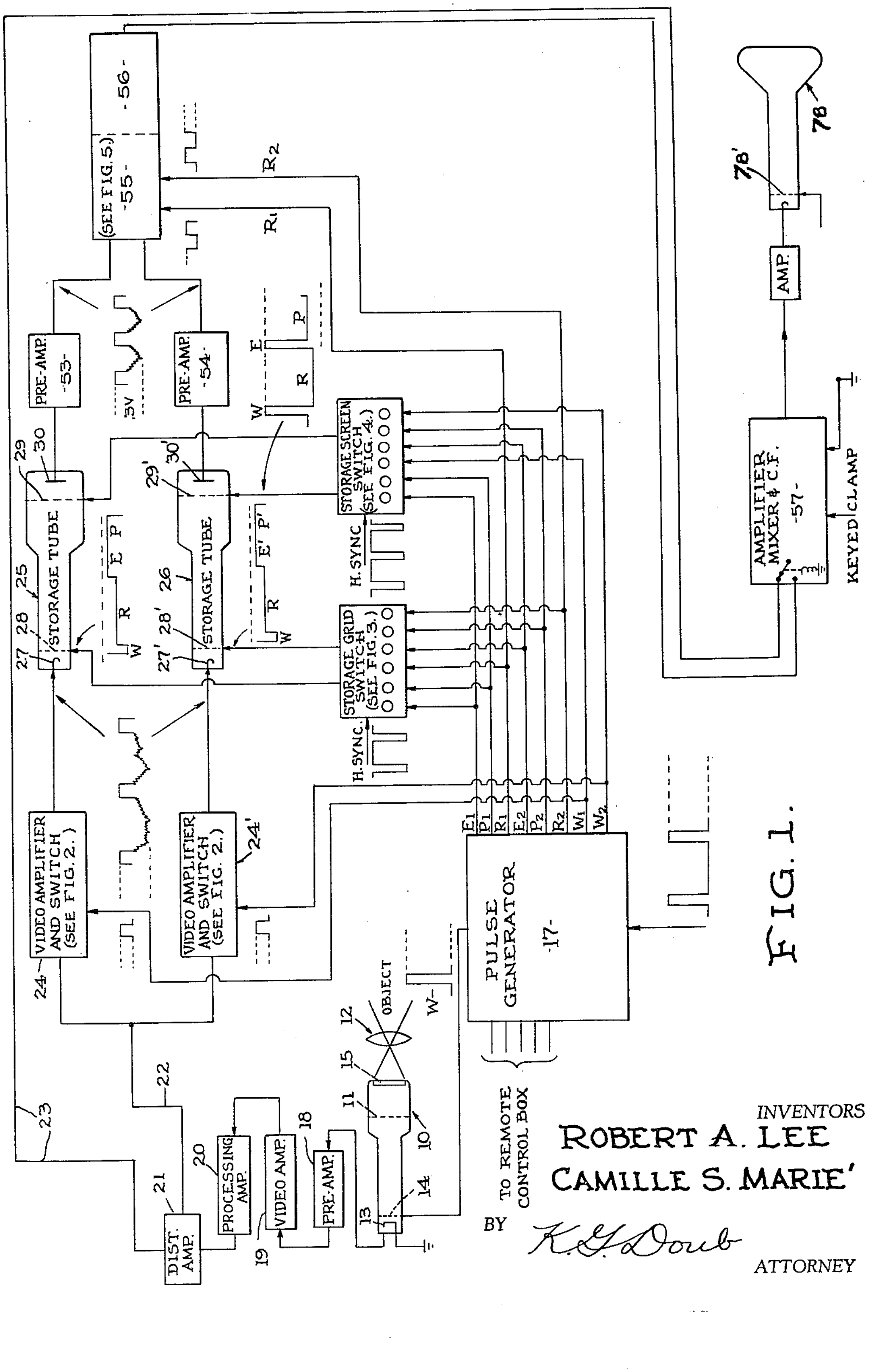
FIG. 1 is a schematic diagram of a closed-circuit television system according to the invention.

Referring to the drawings and first to FIG. 1, a pickup or camera tube is indicated at 10; it is of the standard return-beam type commonly known as the Image Orthicon except that a target having extremely low lateral conductance properties is used. Tubes incorporating such targets are currently manufactured and sold by the General Electric Company and bear the model number GE–Z5294. The target, indicated at 11, is capable of retaining a charge over an integration period up to five seconds, more o rless, without material signal disintegration. An optical system is indicated at 12. The operation of pickup tubes of the return beam type are so well known by those having an elementary knowledge of the art that only such parts of the tube are shown which facilitate an understanding of the system of FIG. 1. The density of the electron beam emitted from the cathode 13 is varied by varying the bias potential on the control grid 14. The photocathode of the pickup tube is indicated at 15. The beam is alternately biased or "pulsed" on and off by a chain of pulses W, which along with other gating and like control pulses, to be described, may be generated in any conventional manner by devices such as multivibrators, and differentiators and clippers, housed in a pulse-generator chassis 17. The time interval between pulses W may, of course, be varied to suit the storage or single-integration characteristics of the pickup tube. In practice, using a GE–Z5294 tube, the beam cut-off time ranges from 1/30 to 10 seconds and the "on" or scan time is equal to the frame (or field) interval, or about 40 milliseconds, depending on the television frame rate. A 25 frame per second system will be described. The cut-off time, when using a pair of storage tubes, as herein disclosed, should exceed the time required (approximately 300 milliseconds) to write the signals on the storage tube screen, erase and collect the signals, and prime the screen for a succeeding charge.

The signal output of the pickup tube may be amplified and processed in any conventional manner prior to being applied to the intermediate signal-delay and integrating system. In the present instance, the signals are amplified to about one-fourth of a volt by a preamplifier 18, video amplifier 19 and processing amplifier 20. The preamplifier contains a cascade amplifier of conventional type. The other video amplifiers, 19 and 20, may also be of any conventional type capable of providing the necessary gain and processing functions. The distributor 21 contains the necessary input and output terminals and interconnecting network for transmitting the amplified video signals either to the intermediate signal-delay system by way of line 22, or by way of by-pass line 23 direct to the kinescope input. The line 22 branches off and enters a pair of video amplifier and storage tube switch chassis 24 and 24', each of which contain a gated amplifier such as that shown in FIG.

2, functioning to apply each burst of signals alternately to the cathode 27 or 27′ of a pair of storage tubes, indicated at 25 and 26. These storage tubes may be of conventional single gun construction, each having the usual cathode 27 or 27′, control grid 28 or 28′, storage screen 29 or 29′, and collector plate 30 or 30′. Other parts such as the beam deflection system, focus system, etc., are not shown since they would contribute nothing to an understanding of the invention.

Before proceeding with a description of the intermediate storage system, it is believed advisable to explain the basic control pulses for the beams of the pickup tube and storage tubes and for setting the various potentials of the storage tube grids and screens.

Referring to the pulse timing diagram of FIG. 6, the first series, starting at the top of the figure, represents the basic pulse chain; these may be generated by a conventional blocking oscillator housed in the pulse generator chassis.

The second chain represents a binary count-down generated by a bistable multivibrator.

The third series of pulses represents the output of a differentiator and clipper, which eliminates the positive excursions, leaving negative spikes for triggering the multivibrator which produces the variable delay chain of (4). This multivibrator is triggered "on" by the first negative excursion and remains on for any one of the times indicated, as determined by the setting of a remote control switch. This is the "beam off" time for the pickup tube 10 and storage tubes 25 and 26.

The fifth chain represents the output of a differentiator and clipper for the fourth chain; these trigger a monostable multivibrator which generates a sixth chain of pulses, i.e. the orthicon read-out pulses indicated at W, which gate the beam of the pickup tube on, in this instance for about 40 milliseconds, equal to one frame of video.

The seventh and eighth chains represent the output of a bistable multivibrator, the seventh being the output of one side or tube and the eighth the output of the other.

The ninth series results from differentiation and clipping of the seventh and eighth chains; these function to trigger a monostable multivibrator for the $W_1$ pulses of (11) and $W_2$ pulses of (12). These pulses gate the video input amplifiers (one of which is shown in detail in FIG. 2) on and pass the signals to the appropriate storage tube; and they also control the potentials of the storage tube grids and screens during a frame time, i.e. the period during which the beam is writing video signals on the screen; they set the "write" potentials for said grids and screens.

The negative spikes of (13) serve to trigger monostable multivibrators for generating the $E_1$ and $E_2$ pulses of 14 and 15. These are the "erase" pulses, i.e. they apply an all-white or erase potential to each storage tube screen.

The $R_2$ chain of (16) and the $R_1$ chain of (17) represents the output of a bistable multivibrator which is triggered "on" by the trailing edge of $W_2$ of (12) and triggered "off" by the trailing edge of $W_1$ of (11).

The negative-going spikes of (18) and (19) result from differentiation and clipping of the $E_1$ and $E_2$ pulses of (14) and (15); these serve to trigger a bistable multivibrator "on" for producing the $P_1$ and $P_2$ or priming pulses of (20) and (21). These priming pulses reduce the screen potential to a value such as will condition the screen for writing. The "off" trigger is not shown but is produced by differentiation of $W_1$ and $W_2$.

Figure 2:
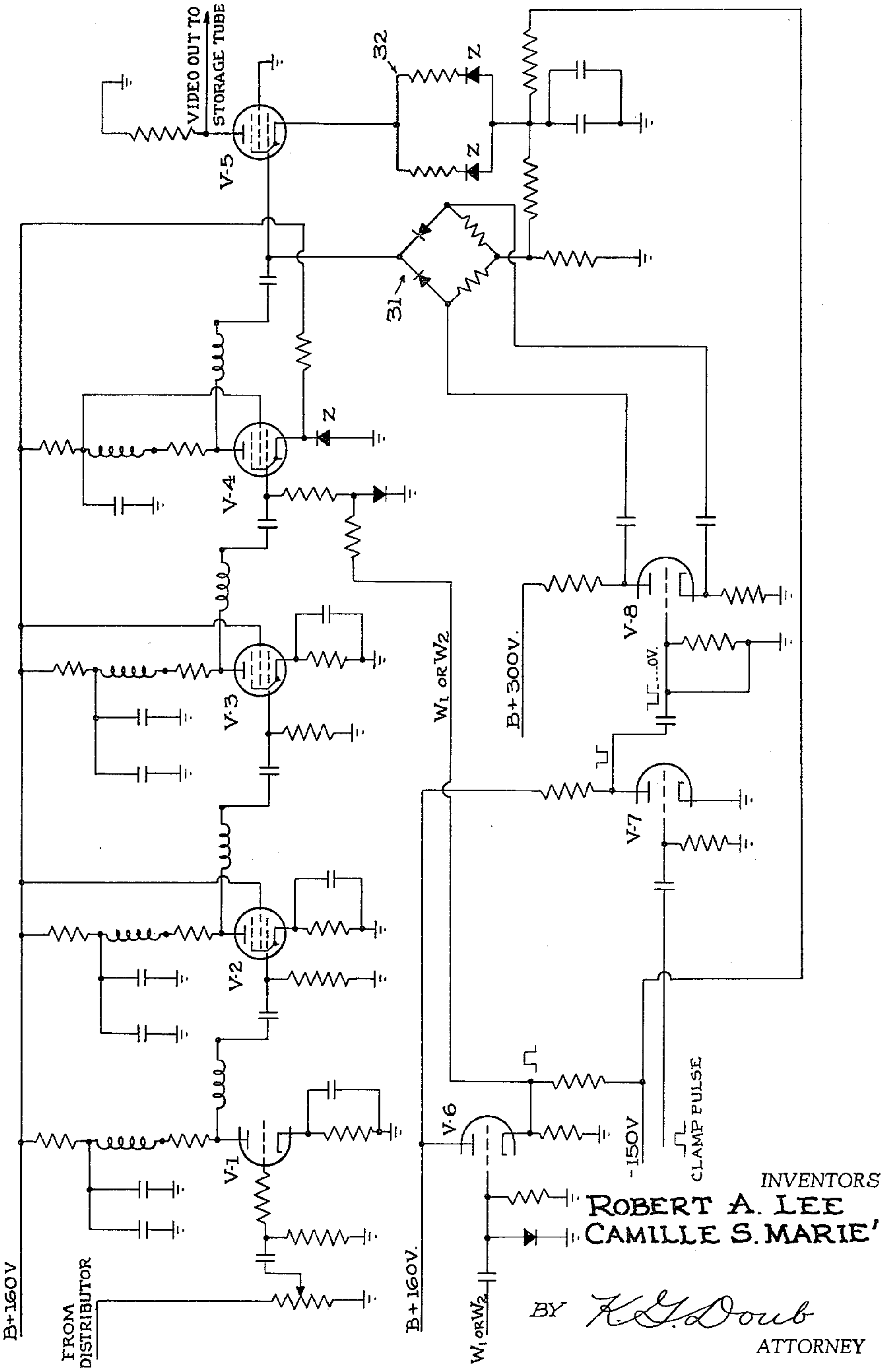
FIG. 2 is an electrical diagram of a video input gated amplifier or switch for the two storage tubes, on the screens of which the succeeding bursts of video from the pickup tube are alternately written by modulating the beam current with video signals applied to the cathodes of said tubes.

Referring to FIG. 2, the video input amplifier and switch (gated amplifier) comprises a series of amplifier stages V–1, V–2 and V–3, a gating stage V–4 and output stage V–5. The electron discharge device of stage V–4, here shown as a vacuum tube, has its control grid connected to a source of $W_1$ or $W_2$ pulses by way of cathode follower V–6. When the pickup tube has its beam biased "on" by a pulse W, V–4, which is normally biased off by the zener diode in its cathode, is gated on by application of a W pulse to its grid, causing a burst of video to be amplified by the amplification stages V–1 to V–3, inclusive, and then passed on to the output stage V–5 and thence to storage tube 25 or 26. Horizontal line rate pulses are fed to amplifier V–7, and the amplified pulses applied to a phase inverter V–8, which feeds opposite polarity pulses to a bridge 31, the output of which is impressed on the grid of the output tube V–5. This provides a keyed clamp of conventional type for maintaining the starting point of each frame line at a given level by eliminating the switching transient injected at V–4. The zener diode resistance network indicated at 32, combined with the grid clamp, sets the value of the bias for the output tube V–5 so that in the absence of video signals at the grid, V–5 plate potential is fixed at or near ground potential.

The gated amplifier circuitry for both storage tubes 25 and 26 is substantially similar, hence the showing of FIG. 2 will suffice for both.

When a burst of video is impressed on the cathode 27 or 27′ or storage tubes 25 or 26 by the amplifier and switch 24 or 24′, the grids 28 or 28′ should be at writing or scan potential, which is usually cut-off bias. In the example shown, it can be assumed that this potential is −25 volts and the scan or frame time is 40 milliseconds. During this writing period, the screen 29 or 29′ of the storage tube should also be at writing potential, say, +300 volts. Following the writing period, there may be a storage or read period of, say, 4 seconds, at which time the grid is biased to a potential of, say, −18 volts, to permit an unmodulated beam current of a given value, and the screen is biased to a potential of, say, +15 volts, to permit modulating the beam which passes through the charged screen and causes the latter to set up an output signal on the collector plate. Following the read period, the screen is "erased" by writing a D.C. signal into the tube, during which the screen voltage should be substantially the same as that during the writing period. Lastly, the screen is primed, i.e. it is reconditioned for the succeeding writing period by scanning it with a constant-current beam while at a potential of, say, +20 volts. The foregoing cycle is then repeated. The waveforms for obtaining these various potentials are shown at the input to the grid and screen of the storage tube 26 in FIG. 1 and at the upper righthand corners of FIGS. 3 and 4; they are obtained by adding and clipping the E, P and R pulses for the grid potentials and the E, P and W pulses for the screen potentials.

Figure 3:
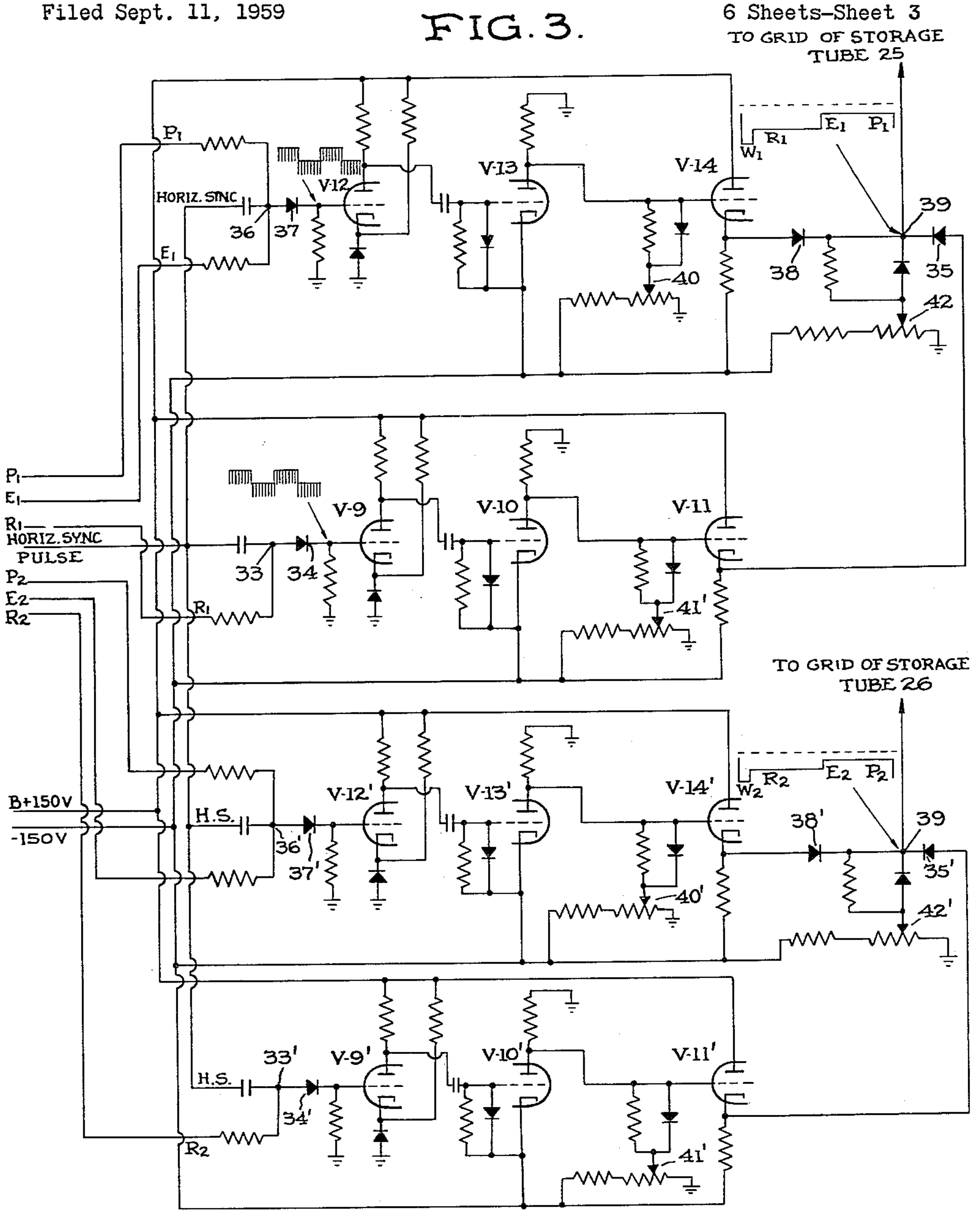
FIGS. 3 and 4 are eelctrical diagrams of the gated amplifiers which combine certain of the control pulses into composite pulses for setting the potentials of the control grids and screens of the storage tubes.

Referring to FIG. 3, which shows a wiring diagram for the storage grid amplifier and switch, the horizontal sync pulses and the R pulses are summed at points 33 and 33′ and passed to diodes 34 and 34′, which function as mixers, resulting in a high frequency signal such as indicated above the diode 34, where an attempt is made to show how the long duration R pulses are "chopped" by the horizontal sync pulses into high-frequency pulses to facilitate amplification without having to pass extremely low frequency components. This signal is amplified, inverted and clipped by stages V–9, V–10 and V–9′, V–10′ and cathode followers V–11 and V–11′ and the output conducted to isolating diodes 35, 35′. As will be understood, the R pulses are of such long duration that it would be difficult to capacity-couple the output of one stage with the input of another without distorting the waveform. The only time that the R pulses are required is during the time a line of video is being traced, hence the horizontal sync pulses may be utilized to advantage since during retrace time (fly-back) the grid (also screen) potential is not critical. This obviates the need for a demodulating stage.

The pulses $P_1$, $E_1$ and the horizontal sync pulses are added at points 36, 36′ and passed to mixer diodes 37, 37′, resulting in a high frequency signal such as indicated above the diode 37, and this signal is amplified, inverted and clipped by stages V–12, V–13 and V–12′, V–13′ and cathode followers V–14, V–14′ and the output conducted to isolating diodes 38, 38′.

The pulses from diodes 35, 35' are summed at points 39 and 39', the resultant waveform having a shape substantially as shown at these latter points.

The potentiometers 40, 41, 42 and 40', 41' and 42' provide a clipping adjustment to set the D.C. levels of the various pulse constituents at the summing points 39. The time base of each pulse remains unchanged; however, certain of the pulses are added to obtain the required length along the time axis.

Figure 4:
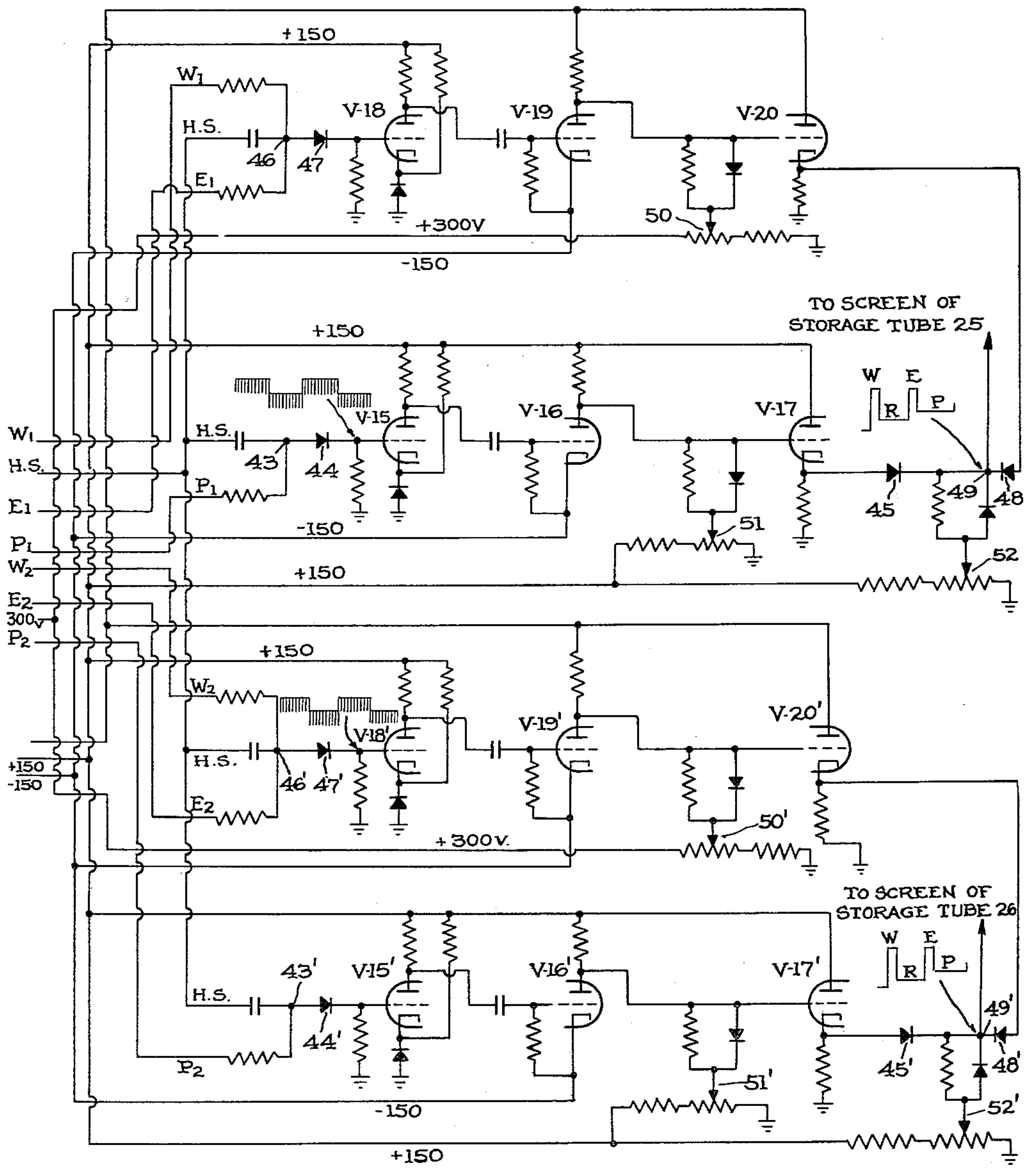

FIG. 4, which is substantially similar to FIG. 3, shows a wring diagram for the storage screen gated amplifier or electronic switch. The horizontal sync pulses and the P pulses are summed at points 43 and 43' and passed to mixer diodes 44 and 44', resulting in a high-frequency signal such as indicated above the diode 44. This signal is amplified, inverted and clipped by stages V–15, V–15', V–16, V–16' and cathode followers V–17 and V–17' and the output conducted to isolating diodes 45 and 45'.

The pulses W, E and the horizontal sync pulses are summed at points 46, 46' and passed to mixer diodes 47, 47', resulting in integration into a high-frequency signal such as indicated above the diode 47'; and this signal is amplified, inverted and clipped by stages V–18, V–18', V–19, V–19' and cathode followers V–20 and V–20' and the output conducted to isolating diodes 48, 48'.

The pulses from diodes 48 and 48' are summed at points 49 and 49', the combined waveform having the shape substantially as shown at these latter points.

The potentiometers 50, 50', 51, 51' and 52, 52' provide a clipping adjustment for setting the magnitude of the pulse constituents.

The video signals alternately taken from the collector plates 30 and 30' of the stoarge tubes 25 and 26 are amplified in a pair of preamplifiers 53 and 54, FIG. 1, the outputs of which are conducted to a gated mixer or electronic switch and amplifier, generally indicated at 55 in FIG. 1 and shown in detail in FIG. 5. The input section of this amplifier functions to alternately switch the input side from one storage tube preamplifier to the other and arrange the individual bursts of signals so received in sequential order and conduct them along a single channel to an output amplifier section, from which they are discharged by a cathode follower to a second output amplifier 56, FIG. 1, and thence to the input chassis 57 of the kinescope receiver, which chassis includes an amplifier, mixer and cathode follower circuitry.

Referring to FIG. 5, the video switch section comprises a pair of pentodes V–21 and V–22. The control grid of V–21 is connected to the video output from preamplifier 53 across gain adjusting potentiometer 58, while the control grid of V–22 is connected to the video output from preamplifier 54 across a similar potentiometer 59.

A pair of zener diodes 60 and 61 and associated by-pass filter network made up of resistors 60', 61' and capacitors 60'' and 61'' hold the cathodes of V–21 and V–22 at a fixed potential of, for example, +17 volts, which is well below cutoff in the absence of grid pulses. The so-called zener diode, or semi-conductor diode operated with reverse bias, has certain advantages when used to set the bias voltage for an electron discharge device, since it maintains a constant potential difference across the diode while permitting wide variations in current through the diode; at the same time it is cheaper and requires less power dissipation than voltage regulators and like devices for performing the desired function. We have discovered, however, that these diodes tend to oscillate at low amplitude and very high frequencies in low impedance circuits having wide bandwidth, such as are present in low-level high gain video amplifiers (they tend to operate in the mode of a relaxation oscillator), and thus cause an intolerable spurious signal. To cure this, we provide an R-C filter in which the diode is coupled to the cathode by a resistor (60', 61') of low value, say 5 ohms (low enough to avoid any appreciable signal or bias voltage drop), while the capacitor (60'', 61'') is small, say in the order of .01 mfd., to pass the very high frequency spurious components without setting up an undesirable reactance to the signal in the cathode circuit. This effectively eliminates to any harmful extent the oscillations which are generated by the diode.

Gating pulses $R_1$ and $R_2$ of the form shown in FIG. 6 are applied to the control grids of V–21 and V–22 across potentiometers 62 and 63 and resistors 64 and 65. The application of a gate pulse raises the grid potential to +16 volts, biasing the tube "on" and causing it to operate at a one-volt bias. Gate pulses are being constantly applied to either one control grid or the other, maintaining the total plate current to the common load resistor 66 at a constant value. Potentiometer 67 is adjustable to obtain a perfect balance in the flow of current to the output circuit, thereby avoiding any fluctuations in the base line direct current component. The capacitors to ground on both sides of the potentiometer resistance are for bypass purposes, one of each pair being of a high capacity electrolytic type and the other a low capacity plate type to obtain a more effective filtering action for high frequencies. The diodes 70 and 71 provide a low resistance path for the leading edge of each read (R) pulse and speed up the time constant to that extent; and they also have a secondary function in that they serve as clamps for the video signals.

It will be seen that the switch of FIG. 5 shares the time equally between each burst of video over the entire range of band-pass frequencies and arranges the bursts in a continuous chain for transmission by way of output conductor 68 to the input side of a pair of amplifier stages V–23, V–24 and cathode follower V–25, the amplifier signals being taken from the cathode lead of V–25 by way of conductor 68 at the junction of the minus terminal of load resistor 72.

*Operation*

As heretofore indicated, when operating at low light levels the scanning beam of the pickup tube is alternately biased "off" and "on" while the scene is being continuously televised; and purely by way of example, it can be assumed that the "off" time is around four or five seconds and the "on" time about 40 milliseconds, or one frame time. During the "off" time the target of the pickup tube is being continuously bombarded by photo-electrons, causing secondary emission of electrons to the target mesh, and leaving a charge which builds up to a point where its beam-modulating potential and hence the signal-to-noise ratio, is much greater than would be the case were the charge read off the target by continuous scanning. It will thus be seen that there will be successive bursts of relatively strong video signals conducted to the gated amplifiers 24, 24' of FIG. 1, an example of which is illustrated in FIG. 2. Here the signals are amplified and alternate bursts are impressed on the cathodes 27, 27' of the strorage tubes 25, 26. When a burst of video is applied to either the cathode 27 or 27', the grid 28 or 28' should be at the writing potential, which is usually cut-off bias, and this potential is automatically controlled by the gated amplifier or electronic switch of FIG. 3. During this writing period, the screen 29 or 29' of each storage tube should also be at the writing potential, which is automatically regulated by the gated amplifier or electronic switch of FIG. 4. Since the "on" time of each storage tube 25 or 26 should coincide with the "on" time of the beam at the pickup tube 10, an orthicon grid pulse W is applied to the control grid of the pickup tube (could be applied to cathode) to bias the beam on while a write pulse $W_1$ or $W_2$ is applied to the grid of a storage tube. In other words, there will be a W pulse for each $W_1$ or $W_2$ pulse, compare the chain of pulses at (6), (11) and (12) in FIG. 6.

Following the orthicon scan or write-off period, the beam is biased off for, say, 4 seconds, which is the charge build-up time for the orthicon target, and during this period the alternate delayed bursts of video signals are being continuously taken from the collector plates 30, 30′ of the storage tubes 25, 26. Hence during the "off" time of the orthicon grid there is either an $R_1$ pulse or an $R_2$ (read) pulse applied to the grids and targets of the storage tubes. During the reading period of a storage tube, its grid may be biased to a potential of, say, −18 volts and its screen to a potential of, say, +15 volts, causing the variations of potential on the screen to modulate the beam and permit the latter to set up the proper output signal on the collector plate; and these potentials are regulated by the gated amplifier or electronic switch of FIG. 4. Next the screen is primed or bleached for a succeeding write period by scanning it with a constant current beam of, say, +20 volts, and hence there is one $P_1$ or $P_2$ (prime) pulse during each "off" time of the orthicon grid or W pulse and for each $R_1$ or $R_2$ pulse.

The delayed video bursts taken from the collector plates 30, 30′ of the storage tubes 25, 26 are preamplified at 53 and 54 and alternately impressed on the grids of the electronic switch or gated output amplifier 55 of FIG. 5. This switch operates to arrange the bursts of video into a single output channel and conduct the chain of signals to the amplifier 57, shown in block diagram in FIG. 1, and which may be of any conventional type. From this amplifier the signals are taken to a video input amplifier and thence impressed on the cathod of a kinescope 78, which also may be of any conventional type and hence the control circuit therefor, other than control grid 78′, is not shown. In this manner, the kinescope presents a continuous picture, or substantially continuous as far as the eye is concerned.

There may be times when it is desirable to by-pass the intermediate storage or signal-delay system, which is the purpose of the by-pass conductor 23. This may be switched on and off in any suitable manner, as by a switch located in the amplifier and mixer chassis 57 and provided with a convenient manual control.

By shorting the basic W, E and orthicon grid pulses of FIG. 6 one-half (on the time axis), the "on" time for the pickup tube beam will be reduced to 20 milliseconds, equal to one field time instead of one frame time. This restricts pickup tube readout to the first field, assuming interlaced scanning with two fields to a frame, which has the advantage of improving the signal-to-noise ratio. This can be explained as follows: Conidering the conventional continuous-scanning technique at low light levels in which the charge is removed from the target faster than it can build up, the first field scan discharges the major portion of the accumulated charge, say 70%, leaving the remainder, 30%, for the second field scan, during which only 80% of this remainder may be discharged. Since beam current, hence beam noise, is constant, the signal-to-noise ratio is much higher in the first field. The first field scan robs a percentage of charge from the second field due to overlap in the effective beam diameter compared to scanning line width. This is particularly true for a high line-number system; a 1029 line frame has two 514½ fields, which is good resolution for low light level work. By scanning one field instead of one frame, we write 514½ lines alternately into each storage tube, but we read out of each tube with two-to-one interlace scanning 1029 lines for display on a 1029 line monitor kinescope.

In practice, both frame and field scanning systems have been operated with marked success.

While the chain pulsing technique with its coacting intermediate storage system has been successfully applied to closed circuit television and is so shown and described herein, it will be obvious that the same system could be applied to a radio frequency system, i.e. one in which the video signals are transmitted to a remotely located receiver by a video-modulated radio frequency wave.

What we claim is:

1. Television apparatus particularly adapted for low light level televising, comprising: a camera or signal pick-up tube having a photocathode on which the scene or information to be televised is projected and a target to be charged by photoelectrons released from the photocathode, means for scanning the target with an electron beam to "read" the charge off the target and generate video signals, means for alternately gating the beam "on" and "off" while continuously televising to permit charge build-up on the target during "off" time and to read the built-up charge off the target during beam "on" time; a video receiver including a visual display cathode ray tube; an intermediate signal-storage system including a pair of storage tubes in which sequential bursts of video signals are alternately stored; means for alternately collecting the signals from the storage tubes including means which repeatedly reads the stored signal appearing on one tube while the other tube is undergoing the erase, prime and write portions of its cycle, thereby effecting transmission of the collected signals along a single channel to said receiver in the original time sequence to present a continuous display of discontinuous bursts of video signals on said visual display tube.

2. Television apparatus particularly adapted for low light level televising, comprising: a camera or signal pick-up tube having a photocathode on which the scene or information to be televised is projected and a target to be charged by photoelectrons released from the photocathode, menas for scanning the target with an electron beam to "read" the charge off the target and generate video signals, means for alternately gating the beam "on" and "off" while continuously televising to permit charge build-up on the target during beam "off" time and to read the built-up charge off the target during beam "on" time, the beam-on time being relatively short compared to the beam-off time; a video receiver including a visual display cathode ray tube; an intermediate signal-storage system including a pair of storage tubes, means for switching sequential bursts of video signals alternately to one or the other of said storage tubes such that one storage tube is undergoing the erase, prime and write portions of its cycle while the preceding burst is being continuously read from the other storage tube, and a gated amplifier and electronic switch functioning to collect the signals from the storage tubes in proper time sequence and transmit the signals along a single channel to said receiver to present a continuous display of dsicontinuous burst of video signals on said visual display tube.

3. Television apparatus particularly adapted for low light level televising, comprising: a camera or signal pick-up tube having a photocathode on which the scene or information to be televised is projected and a target to be charged by photoelectrons released from the photocathode, means for scanning the target with an electron beam to "read" the charge off the target and generate electrical video signals, means for alternately gating the beam "on" and "off" while continuously televising to permit charge build-up on the target during beam-off time and to "read" the built-up charge off the target during beam-on time, the beam-on time being relatively short compared to beam-off time; a video receiver including a visual display cathode ray tube, said pickup tube and visual display tubes being fed coordinated horizontal and vertical sync pulses to control their respective scanning beams; an intermediate signal storage system including a pair of storage tubes each having an input electrode, a control grid, a storage screen and a collector plate; means for switching succeeding bursts of video signals alternately to said input electrodes; gated pulse-combining and amplifying means for impressing the write, read, erase and prime potentials on said control grids and storage screens such that one of said storage tubes is undergoing the erase, prime and write portions of its cycle while the preceding burst is being continuously read from the other storage tube, and a gated amplifier and electronic switch functioning to collect the signal bursts from said collector plates and transmit the signals in proper sequence to said receiver to present a continuous display of discontinuous bursts of video signals on said visual display tube.

4. Television apparatus as claimed in claim 3 wherein said gated pulse combining and amplifying means consists of a pair of gated amplifiers which are fed separate write, read, erase and priming pulses and means are provided for combining these pulses into a composite control pulse, one for the grid and one for the screen of each storage tube.

5. Television apparatus as claimed in claim 3 wherein said gated pulse-combining and amplifying means consists of a pair of gated amplifiers which are fed separate long duration write, read, erase and priming pulses which are combined into a composite control pulse, and said amplifiers are also fed horizontal drive pulses which "chop" each of the long duration pulses into a series of short duration pulses to facilitate amplification across capacity-coupled stages without pulse distortion.

6. Television apparatus as claimed in claim 3 wherein said gated amplifier and electronic switch for collecting the output signals of the storage tubes consists of a mixer circuit including a pair of electron discharge devices, each of said devices being gated on by a read pulse and having a control electrode on which the bursts of video from a storage tube is impressed and an output electrode delivering to a common transmission line.

7. Television apparatus particularly adapted for low light level televising, comprising: a camera or signal pick-up tube having a photocathode on which the scene or information to be televised is projected and a target to be charged by photoelectrons released from the photocathode, means for scanning the target with an electron beam to "read" the charge off the target and generate video signals, means for alternately gating the beam "on" and "off" while continuously televising to permit charge build-up on the target during "off" time and to read the built-up charge off the target during beam "on" time; a video receiver including a visual display cathode ray tube; an intermediate signal-storage system including a pair of storage tubes in which sequential bursts of video signals are alternately stored such that one of said storage tubes is undergoing the erase, prime and write portions of its cycle while the preceding burst is being continuously read from the other storage tube, and means for collecting the signals from said storage tube and effecting continuous transmission of the collected signals in the original time sequence to said receiver.

8. Television apparatus particularly adapted for low light level televising, comprising: a camera or signal pick-up tube having a photocathode on which the scene or information to be televised is projected and a target to be charged by photoelectrons released from the photocathode, means for scanning the target with an electron beam to "read" the charge off the target and generate electrical video signals, means for alternately gating the beam "on" and "off" while continuously televising to permit charge build-up on the target during beam-off time and to "read" the built-up charge off the target during beam-on time, the beam-on time being relatively short compared to beam-off time; a video receiver including a visual display cathode ray tube, said pickup tube and visual display tubes being fed coordinated horizontal and vertical sync pulses to control their respective scanning beams; an intermediate signal storage system including a pair of storage tubes each having an input electrode, a control grid, a storage screen and a collector plate; means for switching succeeding bursts of video signals alternately to said input electrodes; gated pulse combining and amplifying means for impressing the write, read, erase and prime potentials on said control grid and storage screen such that one of said storage tubes is undergoing the erase, prime and write portions of its cycle while the preceding burst is being continuously read from the other storage tube, and a gated amplifier and electronic switch functioning to collect the signals from said collector plate and continuously transmit the signals in proper sequence to said receiver.

References Cited in the file of this patent

UNITED STATES PATENTS

| | | |
|---|---|---|
| 2,158,261 | Urtel | May 16, 1939 |
| 2,402,053 | Kell | June 11, 1946 |
| 2,406,266 | Sziklai | Aug. 20, 1946 |
| 2,408,108 | Teal | Sept. 24, 1946 |
| 2,696,523 | Theile | Dec. 7, 1954 |
| 2,922,843 | Clark | Jan. 26, 1960 |
| 2,965,712 | Pike | Dec. 20, 1960 |